(12) United States Patent
Jahn et al.

(10) Patent No.: US 7,218,995 B2
(45) Date of Patent: May 15, 2007

(54) DEVICE AND METHOD FOR WORKPIECE CALIBRATION

(75) Inventors: Dirk Jahn, Erlangen (DE); Mirco Vitr, Aachen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/432,243

(22) Filed: May 11, 2006

(65) Prior Publication Data

US 2006/0259180 A1 Nov. 16, 2006

(30) Foreign Application Priority Data

May 13, 2005 (DE) .................. 10 2005 022 344

(51) Int. Cl.
*G06F 19/00* (2006.01)

(52) U.S. Cl. .................. 700/259; 700/186; 700/192

(58) Field of Classification Search ................ 700/186, 700/192, 259
See application file for complete search history.

(56) References Cited

U.S. PATENT DOCUMENTS

| 5,760,415 | A  | * | 6/1998  | Hauck et al. | .......... | 250/559.33 |
| 6,236,896 | B1 | * | 5/2001  | Watanabe et al. | ............. | 700/37 |
| 6,243,621 | B1 | * | 6/2001  | Tao et al. | .................... | 700/245 |
| 6,266,436 | B1 | * | 7/2001  | Bett et al. | .................... | 382/141 |
| 6,283,681 | B1 | * | 9/2001  | Raiteri | ........................ | 408/1 R |
| 6,319,323 | B1 | * | 11/2001 | Gibson et al. | .............. | 118/680 |
| 6,321,137 | B1 | * | 11/2001 | De Smet | ..................... | 700/245 |
| 6,415,191 | B1 | * | 7/2002  | Pryor | .......................... | 700/95 |
| 6,587,752 | B1 | * | 7/2003  | Saito | .......................... | 700/264 |
| 2001/0016786 | A1 | * | 8/2001 | Takahashi et al. | .......... | 700/195 |

FOREIGN PATENT DOCUMENTS

DE 197 05 170 A1 8/1998
DE 102 08 990 A1 9/2003

OTHER PUBLICATIONS

"Laser Takes Measure of Production Workpieces"—Tooling and Production Magazine, printed from http://www.manufacturingcenter.com/tooling/archives/0599/599tec.asp, originally published May 1999.*

* cited by examiner

*Primary Examiner*—Michael D. Masinick

(57) ABSTRACT

The invention relates to a device and a method for determination of location information of a workpiece. To enable rapid calibration of a relative position of the workpiece (1) in relation to a tool provided for processing said workpiece, it is proposed that the device
features a camera for recording at least a partial area of the workpiece,
first processing means for determination of geometrical parameters on the basis of the partial area recorded by the camera,
a memory for a geometry model of the workpiece and
second processing means for determining the location in-formation of the workpiece by reconciling the geometrical parameters with the geometry model, with the location information being provided for determining the position of the workpiece in relation to a tool pro-vided for processing it.

16 Claims, 3 Drawing Sheets

DEVICE AND METHOD FOR WORKPIECE CALIBRATION

CROSS REFERENCE TO RELATED APPLICATIONS

This application claims priority to the German Application No. 10 2005 022 344.3, filed May 13, 2005 which is incorporated by reference herein in its entirety.

FIELD OF INVENTION

The invention relates to a device and a method for determination of location information of a workpiece for determining the position of the workpiece in relation to a tool provided for processing said workpiece.

BACKGROUND OF INVENTION

This type of device or this type of method are used for example with numerically-controlled machine tools, known as CNC machines, in which, for manufacturing a component, the tool is guided automatically relative to the workpiece to be processed in accordance with programmed traversing movements.

To enable a desired component contour to be obtained the location of the workpiece within the machine tool must be known as exactly as possible. This can be guaranteed by a work holding device tailored to the workpiece which allows exact positioning of the workpiece. Alternatively the location of the workpiece must be calibrated so that this can be taken into account during workpiece processing. Only in this way for example is it possible to guarantee during a cutting process that the volume actually removed matches the cutting volume defined during processing planning and NC programming and that the desired component quality is thus obtained.

SUMMARY OF INVENTION

The calibration of workpieces for small and medium-sized series production runs is currently undertaken as a rule using a measurement sensor which is clamped in the workpiece holder. This measurement sensor moves at low speed in the direction of the workpiece until it is in contact with the workpiece. To determine the precise location of the workpiece this sensor must be moved up to it a number of times. The location of the workpiece can subsequently be determined from the points defined in this manner.

For example a device is known from DE 41 10 209 C2 for detecting external dimensions of a tool and/or of a tool able to be moved with the aid of feed drives on a CNC-controlled grinding machine, as well as for determining the relative location of tool and workpiece with a sensor element operating by mechanical contact for recording dimensions characterizing the workpiece or the workpiece location.

An object of the invention is to make possible a rapid calibration of a relative location of a workpiece in relation to a tool provided for processing this workpiece.

This object is achieved by a device for determination of location information of a workpiece with
  a camera for recording at least a partial area of the workpiece,
  first processing means for determining geometrical parameters based on the partial area recorded by the camera,
  a memory for a geometry model of the workpiece and
  second processing means for determining the location information of the workpiece by reconciling the geometrical parameters with the geometry model,
  with the location information for determining the position of the workpiece being provided in relation to a tool provided for processing said workpiece.

The object is further achieved by a machine tool with such a device and a numerical control for automatic processing of the tool on the basis of the location information.

The object is achieved by a method for determining location information of a workpiece with the following method steps:
  Recording at least a partial area of the workpiece with a camera,
  Determining geometrical parameters based on the partial area recorded by the camera,
  Determining the location of the workpiece by reconciling the geometrical parameters with a geometry model of the workpiece stored in memory and
  Determining the position of the workpiece in relation to a tool provided for its processing with reference to the location information.

The invention is based on the knowledge that by optically recording the workpiece in combination with the geometry model which describes the outer contours of the workpiece, much faster position determination of the workpiece to be processed is possible in comparison to conventional methods. The basic idea of the invention is to use the camera and the first processing means, which especially can also be integrated into the camera, to determine the necessary geometrical parameters, which in combination with the geometry model stored in the memory enable feedback to be provided about the location of the workpiece in relation to the tool provided for processing it.

This type of optical method is very much faster than conventional tactile methods in which a measuring head, in order to avoid collisions, is moved slowly up to the workpiece to be calibrated and, when it makes contact, the coordinates of a point of the workpiece are determined. A number of measuring points are necessary for determining the location, so that this time-consuming process has to be repeated many times.

For example the first processing means for determining the geometrical parameters of the workpiece could be provided to this end by means of an image processing algorithm. For example one edge of the workpiece could be detected by an image recognition process. If the same edge is also detected in the geometry model, this information can be used to determine the relative location of the workpiece very easily and very quickly.

A further useful embodiment of the invention is characterized in that the device features a light source for illuminating the workpiece and the first processing means for determining the geometrical parameter of the workpiece are provided by means of a triangulation process. With a simple triangulation process the workpiece is illuminated with the aid of a light source from a specific angle and the reflected light is recorded by a camera. For a known incident angle of the light and a known distance between the light source and the camera the coordinates of a measuring point of the workpiece can be determined Regardless of the method used to determine the geometrical parameters, it is advantageous to provide the second processing means for determining the location information by detecting characteristic elements of the workpiece and their perspective distortions in relation to the geometry model. Edges, corners or curves of the workpiece can serve as characteristic elements. Unlike conventional methods where there is tactile calibration of the component, it is sufficient in this embodiment, to detect an edge of the workpiece for example and to identify its perspective distortions by comparison with the geometry model. This provides all the information needed for determining the location of the workpiece in relation to the tool.

Generally the precise location of the workpiece is needed for a subsequent machining process with the aid of the tool. It is especially advantageous in such a case for the second processing means to be provided for determination of a matrix which describes a displacement and/or a rotation of the workpiece in relation to a reference position. For example the matrix can be provided in this case for calibration of a numerical control of a machine tool. For example coordinates are stored in an NC program for traversing paths of the tool which are to be followed for processing the workpiece. In the programming of the NC program these types of traversing path can be programmed for a specific reference position or reference location of the tool. Deviations from the real position of the workpiece in relation to this reference position or reference location are described in such an embodiment by the matrix, so that a corresponding calibration of the traversing paths stored in the NC program can be undertaken.

Especially in cases where very high demands are imposed on the exactness of the location determination it can be worthwhile for the device to feature an especially tactile sensor for fine measurement of the workpiece in conjunction with the determination of the location information with the second processing means. In such an embodiment the optical calibration of the component with the aid of the camera and the geometry model stored in the memory is initially used for roughly determining the position of the workpiece in relation to the tool. On the basis of this rough position determination however the tactile sensor can already be moved into a suitable starting position for fine measurement. Subsequently the fine measurement of the tool is undertaken, especially by conventional tactile methods. Through this embodiment of the invention the high accuracy of a tactile calibration method is obtained but there is an extreme reduction in the time taken for the calibration of the workpiece compared to conventional methods. With conventional methods a very slow approach of the tactile sensor to the workpiece is necessary in order to avoid collisions between the sensitive measuring head and the workpiece. This very time-consuming approach phase is avoided by predetermining the rough position of the workpiece.

BRIEF DESCRIPTION OF THE DRAWINGS

The invention is described and explained in more detail below on the basis of the exemplary embodiments shown in the Figures. The figures show.

DETAILED DESCRIPTION OF INVENTION

Figure 1:
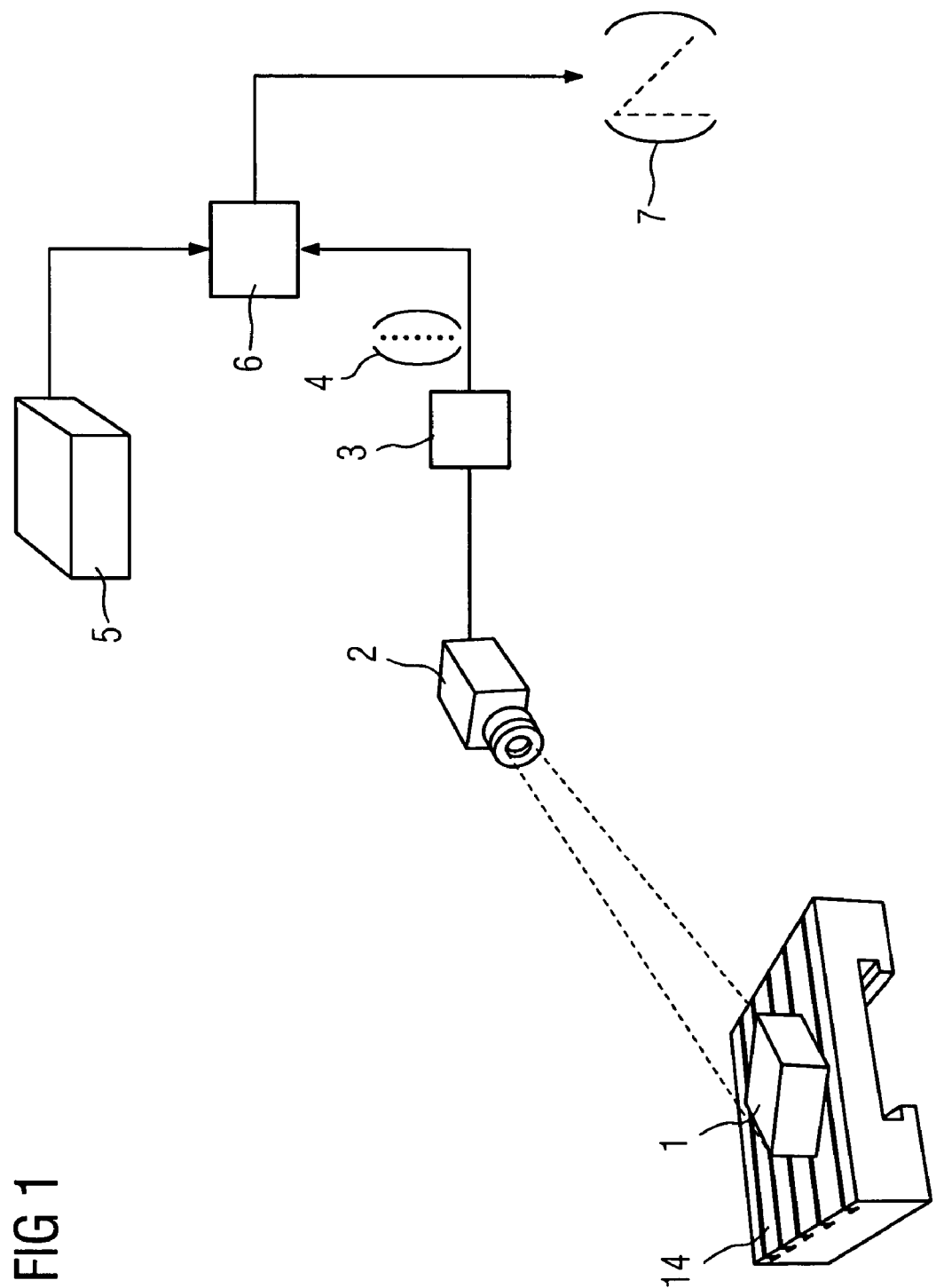
FIG. 1 a schematic diagram of a method for determining the location of a workpiece FIG. 2 a schematic diagram of a method for NC control of a machine tool FIG. 3 a schematic diagram of a further method for determining the location of a workpiece

FIG. 1 shows a schematic diagram of a method for determining the location of a workpiece 1. The workpiece 1 is clamped onto a workpiece table 14 for processing by a tool not shown in this diagram. After an operator has activated a command via a control for visual measurement of the workpiece 1, the workpiece table 14 moves into the recording range of a camera 2. Alternatively the camera 2 can of course also be embodied as a mobile device, so that it can be moved towards the workpiece table 14 for recording the workpiece 1.

The camera 2 is for example a CCD or CMOS camera of which the image data is transmitted to a first processing means 3. The first processing means 3, which is especially realized in the form of a microprocessor integrated into the camera, uses the image data to generate geometrical parameters 4, with mathematical algorithms already known from image processing being employed for this purpose. For example the geometrical parameters describe one or more edges of the workpiece 1.

A simplified geometry model 5 of the workpiece 1 is stored in a memory which describes the outer contours of the workpiece 1. Second processing means 6 are able, by reconciling the geometry model 5 and the previously defined geometrical parameters 4, to determine location information which describes the location of the workpiece 1 in relation to the reference location or reference position. This type of location information, which is specified for determining the position of the workpiece 1 in relation to a tool provided for processing it, is stored in the form of a matrix 7 and is available for subsequent processing of the workpiece 1 by a tool in this manner.

The second processing means can be provided by a further processor or controller. Alternatively the second processing means 6 can also be embodied jointly with the first processing means 3 in the form of the microprocessor integrated into the camera.

Figure 2:
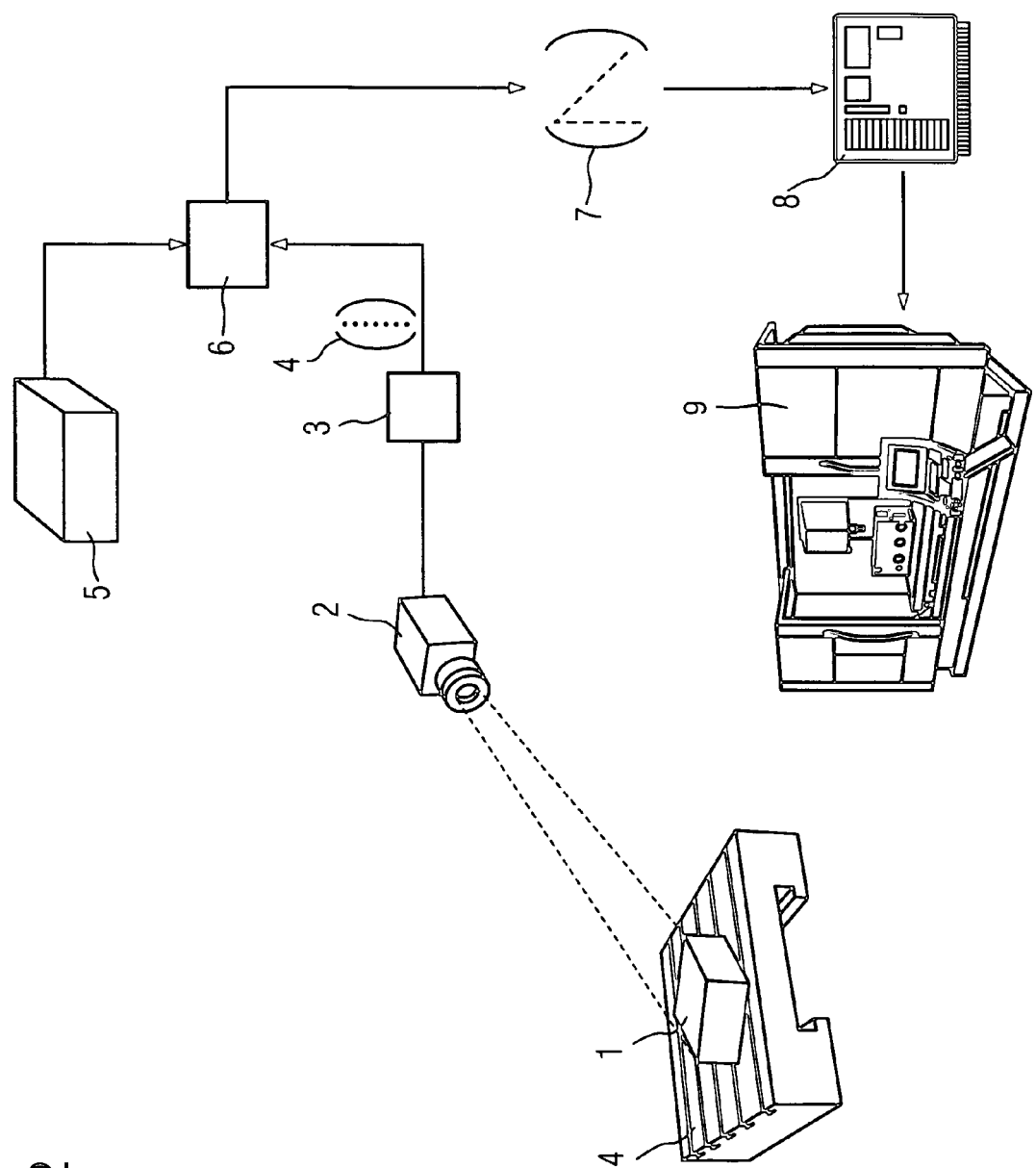

FIG. 2 shows a schematic diagram of a method for NC control of a machine tool 9. The machine tool is for example typically an NC-controlled milling machine, with which a component is manufactured from a workpiece 1 in accordance with an NC program. To this end the machine tool 9 has a numerical control 8 into which the NC program is loaded by a user. Traversing paths are defined within the program which must be traversed during processing by a corresponding tool.

To guarantee exact processing of the workpiece 1 the location of the workpiece 1 must be known in relation to a tool provided for processing. To guarantee this the machine tool has a device for recording the location of the workpiece 1. The components of this device and its functionality correspond to the components and their interactions already described for FIG. 1. Furthermore the same reference symbols have been selected in FIG. 2 for components which have the same functions as in FIG. 1.

The following scenario is conceivable for the use of the integrated optical location detection already described in conjunction with the machine tool 9:

Initially an operator clamps a workpiece 1 onto the workpiece table 14. Subsequently the operator starts an NC program via the numerical machine control 8 in which the necessary steps for processing the workpiece 1 are programmed. In addition the NC program contains a simplified geometry model 5 of the workpiece 1 to be programmed.

The first procedural step which is programmed within the NC program includes detection of the location of the workpiece 1. To this end, as already described in FIG. 1, a partial area of the workpiece 1 is recorded with the camera 2, and with the aid of the first processing means 3 first geometrical parameters 4 are created. On the basis of the geometrical parameters 4 and the geometry model 5 of the workpiece 1 stored in the NC-program, the second processing means 6 generates a matrix 7 in which the translation and rotation information of the workpiece 1 in relation to a reference position is stored.

The traversing paths of the tool stored within the NC program are initially defined on the basis of these reference positions. To enable the desired component contour to be created with the aid of the milling tool, the coordinates of the traversing path are corrected with the aid of the matrix 7. Through the transformation of the individual movement coordinates the tool movements relative to workpiece 1 now exactly correspond to the desired tool movements.

Figure 3:
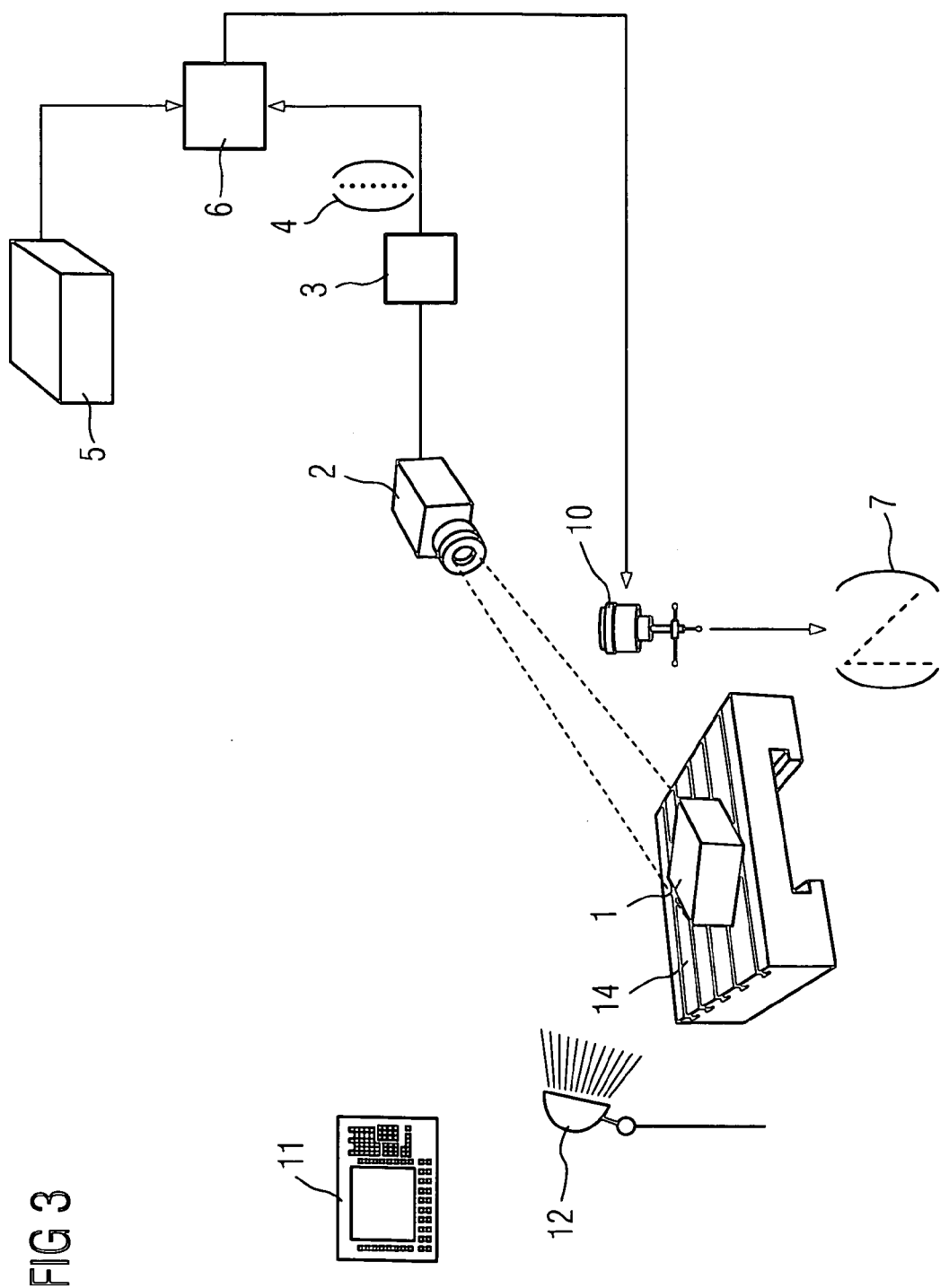

FIG. 3 shows a schematic diagram of a further method for determining the location of a workpiece 1. Here too the same reference symbols are used for the same components of the elements already dealt with in FIGS. 1 and 2.

In this case the method for location detection is followed by a fine measurement which is necessary to fulfill the very high requirements for determining the location of the workpiece 1 in relation to the tool provided for processing it.

In the example shown the recording of the location of the workpiece 1 is started via an HMI 11, e.g. a touchscreen. In this case a triangulation method is first used with the aid of the camera 2, the first processing means 3 and a light source 12, to create a set of geometrical parameters 4. In this case the light falling onto the workpiece 1 from the light source 12 and reflected back by the workpiece is measured by the camera 2. Provided the distance between the camera 2 and the light source 12 is known and also the angle of incidence of the light generated in the light source in relation to the workpiece 1, the coordinates of a point on the surface of the workpiece 1 can be recorded. In this manner sufficient geometrical parameters 4 are created, so that by reconciliation with the geometrical model 5, first location information can be created. On the basis of this location information a tactile sensor 10 is now moved into a suitable start position from where the sensor can determine a first measuring point of the workpiece 1. From the previously optically generated location information the tactile sensor can be moved very rapidly into the suitable start position, without any danger of a collision with the workpiece 1. A significant saving in time is achieved in this way compared to conventional purely tactile precision measurement processes as are known from machine tool engineering.

After the precision measurement of the workpiece 1 by the tactile sensor 10 a matrix 7 is subsequently available via which a numerical control or the traversing coordinates defined in an NC program can be corrected.

The invention claimed is:

1. A device for determining location information of a workpiece, comprising:
 a camera for recording at least a partial area of the workpiece;
 a first processing unit for determining geometrical parameters of the workpiece based on the recorded partial area recorded;
 a memory having a geometry model of the workpiece; and
 a second processing unit for calculating the location information by matching the geometrical parameters to the geometry model, wherein the location information includes information for positioning the workpiece relative to a tool provided for processing the workpiece.

2. The device in accordance with claim 1, wherein the first processing unit includes an image processing algorithm.

3. The device in accordance with claim 1, further comprising a light source for illuminating the workpiece, wherein the first processing unit includes a triangulation algorithm.

4. The device in accordance with claim 1, wherein the second processing unit is configured to detect characteristic elements of the workpiece and to detect perspective distortions of the characteristic elements relative to the geometry model.

5. The device in accordance with claim 1, wherein the second processing unit is configured to determine a matrix representing a displacement or a rotation of the workpiece relative to a reference position.

6. The device in accordance with claim 5, wherein a numerical control unit for controlling the tool is calibrated based on the matrix.

7. The device in accordance with claim 1, further comprising a precision sensor for precisely measuring the workpiece after the location information has been calculated.

8. The device in accordance with claim 7, further comprising a transport device for guiding the precision sensor or the workpiece into a starting position from which the precise measurement is started.

9. A machine tool device for automatically processing a workpiece, comprising:
 a device for determining location information of a workpiece, the device comprising:
  a camera for recording at least a partial area of the workpiece;
  a first processing unit for determining geometrical parameters of the workpiece based on the recorded partial area recorded;
  a memory having a geometry model of the workpiece; and
  a second processing unit for calculating the location information by matching the geometrical parameters to the geometry model, wherein the location information includes information for positioning the workpiece relative to a tool provided for processing the workpiece; and
 a numerical control device for controlling the tool based on the calculated location information.

10. A method of determining location information of a workpiece, comprising:
 recording at least a partial area of the workpiece using a camera;
 determining geometrical parameters of the workpiece based on the recorded partial area;
 calculating the location information by matching the geometrical parameters to a stored geometry model of the workpiece; and
 determining a position of the workpiece relative to a tool provided for processing the workpiece based upon the location information.

11. The method in accordance with claim 10, wherein determining geometrical parameters are determined by an image processing algorithm.

12. The method in accordance with claim 10, wherein determining geometrical parameters are determined by an triangulation algorithm.

13. The method in accordance with claim 10, wherein calculating the location information includes detecting characteristic elements of the workpiece and detecting perspective distortions of the characteristic elements relative to the geometry model.

14. The method in accordance with claim 10, wherein calculating the location information includes determining a matrix representing a displacement or a rotation of the workpiece relative to a reference position.

15. The method in accordance with claim 14, further comprising calibrating a numerical control unit for controlling the tool based upon the matrix.

16. The method in accordance with claim 10, further comprising precisely measuring the workpiece location after the location information has been determined, with a precision sensor.

\* \* \* \* \*